United States Patent
Iwashina

(10) Patent No.: US 11,353,716 B2
(45) Date of Patent: Jun. 7, 2022

(54) SCANNING-TYPE DISPLAY DEVICE AND SCANNING-TYPE DISPLAY SYSTEM

(71) Applicant: HAMAMATSU PHOTONICS K.K., Hamamatsu (JP)

(72) Inventor: Shinya Iwashina, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 129 days.

(21) Appl. No.: 16/621,391

(22) PCT Filed: Jun. 11, 2018

(86) PCT No.: PCT/JP2018/022262
§ 371 (c)(1),
(2) Date: Dec. 11, 2019

(87) PCT Pub. No.: WO2018/230512
PCT Pub. Date: Dec. 20, 2018

(65) Prior Publication Data
US 2020/0257130 A1    Aug. 13, 2020

(30) Foreign Application Priority Data

Jun. 13, 2017  (JP) .............................. JP2017-116329

(51) Int. Cl.
*G02B 26/08*   (2006.01)
*G02B 27/48*   (2006.01)
(Continued)

(52) U.S. Cl.
CPC ........... *G02B 27/48* (2013.01); *G02B 3/0037* (2013.01); *G02B 5/0278* (2013.01);
(Continued)

(58) Field of Classification Search
CPC .... G02B 27/48; G02B 3/0037; G02B 5/0278; G02B 19/0052; G02B 26/0833;
(Continued)

(56) References Cited

U.S. PATENT DOCUMENTS

| 8,675,283 B2* | 3/2014 | Fujikawa ........... G02B 27/0101 359/630 |
| 2009/0161191 A1 | 6/2009 | Powell |
| 2016/0085084 A1 | 3/2016 | Masson et al. |

FOREIGN PATENT DOCUMENTS

| CN | 103033930 A | 4/2013 |
| CN | 103221871 A | 7/2013 |

(Continued)

OTHER PUBLICATIONS

International Preliminary Report on Patentability dated Dec. 26, 2019 for PCT/JP2018/022262.

(Continued)

*Primary Examiner* — Euncha P Cherry
(74) *Attorney, Agent, or Firm* — Faegre Drinker Biddle & Reath LLP

(57) ABSTRACT

A scanning-type display device includes: a light source which emits projection-display laser light; a condensing unit which condenses the laser light emitted from the light source; an optical scanning unit which uses the laser light passing through the condensing unit in scanning; and a light diffusion unit which includes a plurality of light diffusion channels arranged in two dimensions and diffuses the laser light scanned by the optical scanning unit. When a wavelength of the laser light is denoted by $\lambda$, an effective opening diameter of the optical scanning unit is denoted by M, a distance from the optical scanning unit to the light diffusion unit is denoted by L, and an arrangement pitch of the plurality of light diffusion channels is denoted by P, the light diffusion unit is configured so that the arrangement pitch becomes a value set on the basis of $P \geq (4\lambda L)/(\pi M)$.

27 Claims, 5 Drawing Sheets

(51) Int. Cl.
*G02B 3/00* (2006.01)
*G02B 5/02* (2006.01)
*G02B 19/00* (2006.01)
*G02B 26/10* (2006.01)
*G02B 27/01* (2006.01)

(52) U.S. Cl.
CPC ..... *G02B 19/0052* (2013.01); *G02B 26/0833* (2013.01); *G02B 26/10* (2013.01); *G02B 27/0101* (2013.01)

(58) Field of Classification Search
CPC .... G02B 26/10; G02B 27/0101; G02B 27/01; B60K 35/00; B60R 11/02
USPC ........................................................ 359/212.1
See application file for complete search history.

(56) References Cited

FOREIGN PATENT DOCUMENTS

| | | |
|---|---|---|
| CN | 103364951 A | 10/2013 |
| CN | 105164575 A | 12/2015 |
| CN | 105579883 A | 5/2016 |
| EP | 3104212 A2 | 12/2016 |
| JP | 2002-014297 A | 1/2002 |
| JP | 2015-145962 A | 8/2015 |
| JP | 2015-225218 A | 12/2015 |
| JP | 2016-133700 A | 7/2016 |
| JP | 2016-151681 A | 8/2016 |
| JP | 2016-224287 A | 12/2016 |
| JP | 2017-003803 A | 1/2017 |
| JP | 2019-009804 A | 1/2017 |
| JP | 2017-78830 A | 4/2017 |
| JP | 2017-097171 A | 6/2017 |
| JP | 2019-002983 A | 1/2019 |
| TW | I443375 B | 7/2014 |
| WO | WO-2016/035607 A1 | 3/2016 |

OTHER PUBLICATIONS

Robert A. Conant et al., "A raster-scanning dull-motion video display using polysilicon micromachined mirrors", Sensors and Actiators A: Physical, Elsevier BV.NL, vol. 83, No. 1-3, May 1, 2000, p. 291-p. 296.

Paul M. Hagelin et al., "Optical Raster-Scanning Displays Based on Surface-Micromachined Polysilicon Mirrors", IEEE Journal of Selected Topi CS in Quantum Electronics, IEEE Service Center, Piscataway, NJ, US, vol. 5, No. 1, Feb. 1, 1999.

\* cited by examiner

SCANNING-TYPE DISPLAY DEVICE AND SCANNING-TYPE DISPLAY SYSTEM

TECHNICAL FIELD

The present disclosure relates to a scanning-type display device and a scanning-type display system.

BACKGROUND ART

There is known a scanning-type display device including a light source which emits projection-display laser light, an optical scanning unit which uses the laser light emitted from the light source in scanning, and a light diffusion unit which diffuses the laser light scanned by the optical scanning unit (for example, see Patent Literature 1). As the light diffusion unit, for example, an optical element including a plurality of light diffusion channels arranged in two dimensions such as a transmissive microlens array is used.

CITATION LIST

Patent Literature

Patent Literature 1: Japanese Unexamined Patent Publication No. 2016-133700

SUMMARY OF INVENTION

Technical Problem

In the above-described scanning-type display device, there is a case in which luminance unevenness (including irregular luminance unevenness (speckle) and regular luminance unevenness) occurs on a displayed image since the laser light is coherent light.

An object of the present disclosure is to provide a scanning-type display device and a scanning-type display system capable of suppressing an occurrence of luminance unevenness on a displayed image.

Solution to Problem

A scanning-type display device according to an aspect of the present disclosure includes: a light source which emits projection-display laser light; a condensing unit which condenses the laser light emitted from the light source; an optical scanning unit which uses the laser light passing through the condensing unit in scanning; and a light diffusion unit which includes a plurality of light diffusion channels arranged in two dimensions and diffuses the laser light scanned by the optical scanning unit, in which when a wavelength of the laser light is denoted by $\lambda$, an effective opening diameter of the optical scanning unit is denoted by M, a distance from the optical scanning unit to the light diffusion unit is denoted by L, and an arrangement pitch of the plurality of light diffusion channels is denoted by P, the light diffusion unit is configured so that the arrangement pitch becomes a value set on the basis of $P \geq (4\lambda L)/(\pi M)$.

According to the scanning-type display device, the condensing size of the laser light in the light diffusion unit can be set to be equal to or smaller than the arrangement pitch of the light diffusion channel. Thus, according to the scanning-type display device, it is possible to suppress an occurrence of luminance unevenness on a displayed image.

In the scanning-type display device of an aspect of the present disclosure, the light diffusion unit may be configured so that the arrangement pitch becomes a value set on the basis of $P \geq (4\lambda L)/(\pi M) + L\lambda/M$. Accordingly, since the condensing size of the laser light in the light diffusion unit can be set to be equal to or smaller than the arrangement pitch of the light diffusion channel even when the laser light is diffracted in the optical scanning unit, it is possible to suppress an occurrence of luminance unevenness on a displayed image.

In the scanning-type display device of an aspect of the present disclosure, the optical scanning unit may be an MEMS mirror. Accordingly, it is possible to realize the high-speed and high-accuracy scanning of the laser light with respect to the light diffusion unit.

In the scanning-type display device of an aspect of the present disclosure, when a curvature radius of a mirror surface of the MEMS mirror is denoted by $\phi$, the light diffusion unit may be configured so that the arrangement pitch becomes a value set on the basis of $P \geq (4\lambda L)/(\pi M) + 2L \tan(2 \tan^{-1}(M/(2\phi)))$. Accordingly, since the condensing size of the laser light in the light diffusion unit can be set to be equal to or smaller than the arrangement pitch of the light diffusion channel even when the mirror surface of the MEMS mirror is distorted, it is possible to suppress an occurrence of luminance unevenness on a displayed image.

In the scanning-type display device of an aspect of the present disclosure, the light diffusion unit may be a transmissive microlens array. Accordingly, it is possible to reliably and easily realize the diffusion of the laser light by the plurality of light diffusion channels arranged in two dimensions.

A scanning-type display system according to an aspect of the present disclosure includes: a light source which emits projection-display laser light; a condensing unit which condenses the laser light emitted from the light source; an optical scanning unit which uses the laser light passing through the condensing unit in scanning; and a light diffusion unit which includes a plurality of light diffusion channels arranged in two dimensions and diffuses the laser light scanned by the optical scanning unit, in which when a wavelength of the laser light is denoted by $\lambda$, an effective opening diameter of the optical scanning unit is denoted by M, a distance from the optical scanning unit to the light diffusion unit is denoted by L, and an arrangement pitch of the plurality of light diffusion channels is denoted by P, the light diffusion unit is configured so that the arrangement pitch becomes a value set on the basis of $P \geq (4\lambda L)/(\pi M)$.

According to the scanning-type display system, the condensing size of the laser light in the light diffusion unit can be set to be equal to or smaller than the arrangement pitch of the light diffusion channels. Thus, according to the scanning-type display system, it is possible to suppress an occurrence of luminance unevenness on a displayed image.

The scanning-type display system according to an aspect of the present disclosure may further include an optical system which is disposed at a subsequent stage of the light diffusion unit. Also in this case, it is possible to suppress an occurrence of luminance unevenness on a displayed image.

Advantageous Effects of Invention

According to the present disclosure, it is possible to provide a scanning-type display device and a scanning-type display system capable of suppressing an occurrence of luminance unevenness on a displayed image.

DESCRIPTION OF EMBODIMENTS

Figure 1:
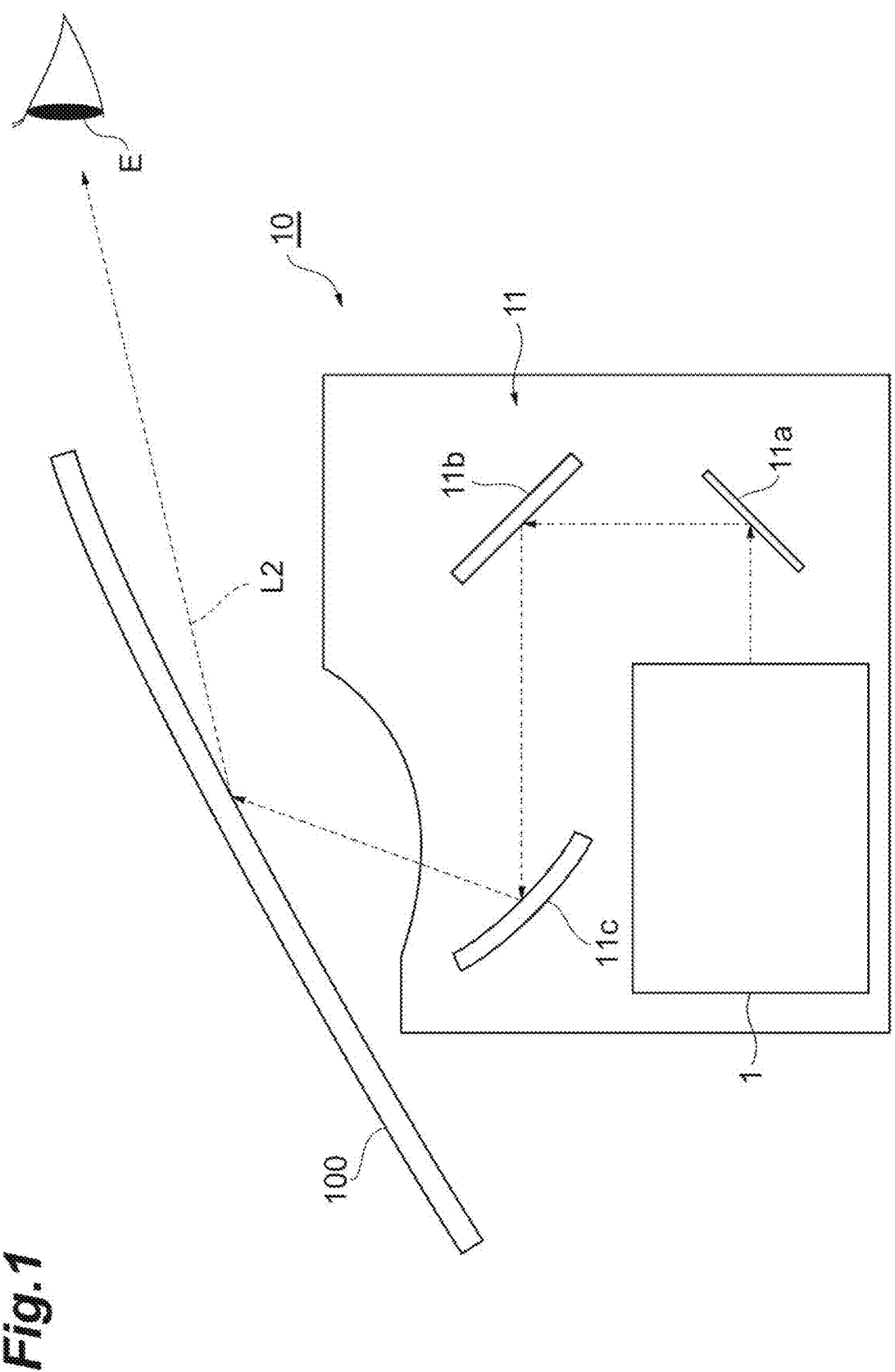
FIG. 1 is a configuration diagram of a scanning-type display system of an embodiment.

Hereinafter, an embodiment of the present disclosure will be described in detail with reference to the drawings. In the drawings, the same or corresponding components will be denoted by the same reference numerals and a redundant description thereof will be omitted.

As illustrated in FIG. 1, a scanning-type display system 10 is, for example, a laser scanning-type projection display mounted on an automobile and displays (projection-displays) an image on a front glass 100 of the automobile. The scanning-type display system 10 includes a scanning-type display device 1 and an optical system 11. The optical system 11 includes a plurality of flat mirrors 11a and 11b, a concave mirror 11c, and the front glass 100. The front glass 100 functions as an optical element at the last stage of the optical system 11. Projection-display light L2 emitted from the scanning-type display device 1 is sequentially reflected by the flat mirror 11a, the flat mirror 11b, the concave mirror 11c, and the front glass 100 and is incident to an eye E of an observer.

Figure 2:
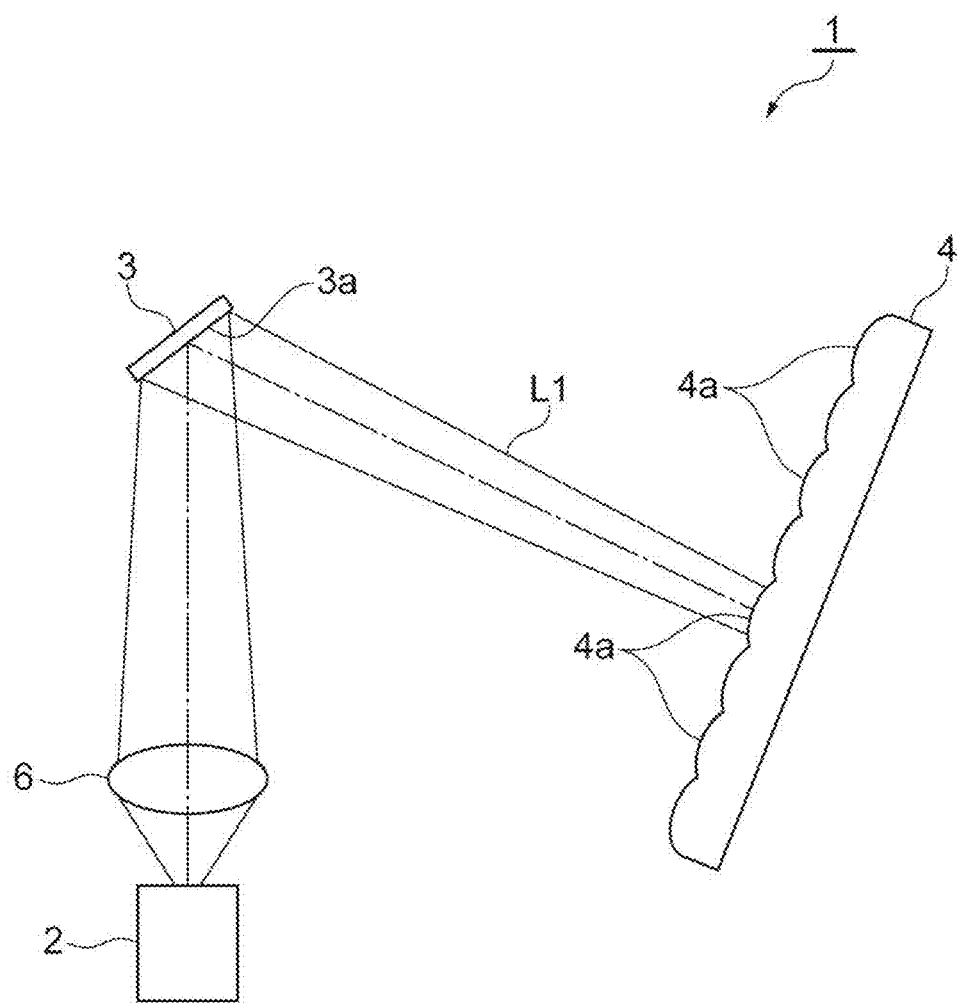
FIG. 2 is a configuration diagram of a scanning-type display device of the scanning-type display system illustrated in FIG. 1.

As illustrated in FIG. 2, the scanning-type display device 1 includes a light source 2, a condensing unit 6, an optical scanning unit 3, and a light diffusion unit 4. The light source 2 emits projection-display laser light L1. More specifically, the light source 2 includes a plurality of light emitting portions. For example, the plurality of light emitting portions are respectively a red laser diode, a green laser diode, and a blue laser diode. Each light emitting portion emits the laser light L1 having a visible wavelength. The laser light L1 emitted from each light emitting portion is incident to the condensing unit 6. The condensing unit 6 condenses the laser light L1 emitted from each light emitting portion. The condensing unit 6 is, for example, a condensing lens. The laser lights L1 emitted from the light emitting portions are combined by, for example, a dichroic mirror while the laser lights travel from the condensing unit 6 to the optical scanning unit 3.

The optical scanning unit 3 uses the laser light L1 (the combined laser light L1) passing through the condensing unit 6 in scanning. More specifically, the optical scanning unit 3 is an MEMS mirror which reflects the laser light L1 passing through the condensing unit 6, and uses the laser light L1 in scanning. The MEMS mirror is a drive mirror which is manufactured according to a Micro Electro Mechanical Systems (MEMS) technique and examples of the drive type include an electromagnetic drive type, an electrostatic drive type, a piezoelectric drive type, a thermal drive type, and the like. The optical scanning unit 3 includes a flat mirror 3a. The mirror 3a is tillable about two orthogonal axes and is tilted fast at a resonant frequency in the rotation about one axis. The optical scanning unit 3 which is the MEMS mirror scans the light diffusion unit 4 with the laser light L1.

The light diffusion unit 4 includes a plurality of light diffusion channels 4a which are arranged in two dimensions and diffuses the laser light L1 scanned by the optical scanning unit 3. More specifically, the light diffusion unit 4 is a transmissive microlens array. That is, the light diffusion unit 4 transmits and diffuses the laser light L1 scanned by the optical scanning unit 3. The light diffusion channel 4a is each of, for example, a plurality of microlenses arranged in a matrix shape. The light forming an image in the laser light L1 diffused by the light diffusion unit 4 is incident to the optical system 11 disposed at the subsequent stage of the light diffusion unit 4 as the projection-display light L2 (see FIG. 1). The light incident surface of the light diffusion unit 4 includes a plurality of convex surfaces corresponding to the plurality of microlenses. Meanwhile, the light emission surface of the light diffusion unit 4 is a flat surface.

The scanning-type display device 1 with the above-described configuration is operated as below by a control unit (not illustrated). First, the control unit starts the output of each light emitting portion of the light source 2 when receiving a projection-display start input signal. Accordingly, the laser light L1 is emitted from the light source 2. Almost simultaneously, the control unit starts the operation of the optical scanning unit 3. Accordingly, in the optical scanning unit 3, the tilting of the mirror 3a is started and the laser light L1 emitted from the light source 2 and passing through the condensing unit 6 is scanned with respect to the light diffusion unit 4. At this time, the control unit changes the ratio of the laser light L1 emitted from each light emitting portion of the light source 2 in response to the scan position of the laser light L1 in the light diffusion unit 4. Accordingly, the projection-display light L2 (that is, the light forming an image in the laser light L1 diffused by the light diffusion unit 4) is sequentially reflected by the flat mirror 11a, the flat mirror 11b, the concave mirror 11c, and the front glass 100 and is incident to the eye E of the observer.

Figure 3:
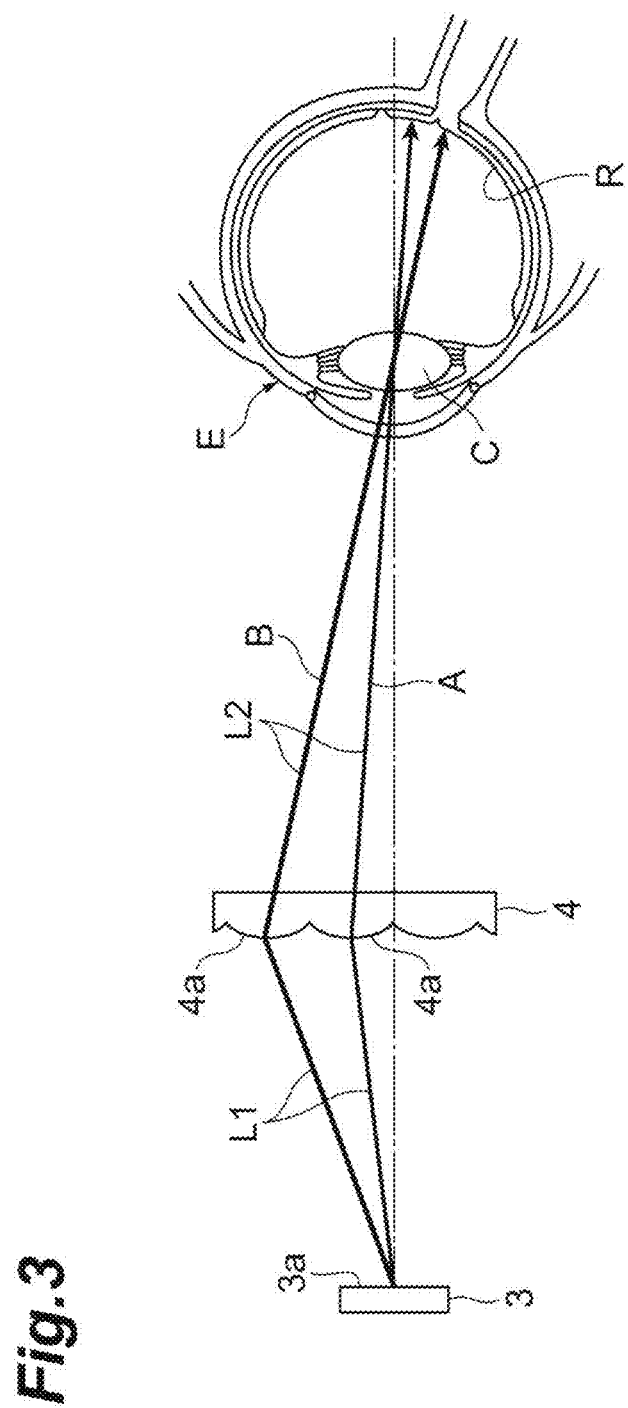
FIG. 3 is a diagram illustrating an optical path extending from an optical scanning unit to an eye through a light diffusion unit.

Here, a principle that luminance unevenness (including irregular luminance unevenness (speckle) and regular luminance unevenness) occurs on the displayed image will be described. FIG. 3 is a diagram illustrating the optical path extending from the optical scanning unit 3 to the eye E through the light diffusion unit 4. For convenience of description, in FIG. 3, the optical scanning unit 3, the light diffusion unit 4, and the eye E are illustrated on one straight line and the optical system 11 is not illustrated.

As illustrated in FIG. 3, when the laser light L1 reflected by the optical scanning unit 3 is incident to a pair of light diffusion channels 4a and 4a adjacent to each other (specifically, the light diffusion channels are adjacent to each other in the horizontal scanning direction and the vertical scanning direction of the laser light L1) arbitrarily selected from among the plurality of light diffusion channels 4a, a part of the light L2 diffused by one light diffusion channel 4a is incident to the eye E through the optical path A and a part of the light L2 diffused by the other light diffusion channel 4a is incident to the eye E through the optical path B. Then, the light L2 incident to the eye E is condensed on a retina R by a lens C. At this time, since an interference occurs when the light L2 incident to the eye E through the optical path A and the light L2 incident to the eye E through the optical path B overlap each other on the retina R, there is a possibility that luminance unevenness may occur on the displayed image. Thus, when the condensing size of the laser light L1 in the light diffusion unit 4 is set to be equal to or smaller than the arrangement pitch of the plurality of light diffusion channels 4a (the "distance between the centers of the light diffusion channels 4a which are adjacent to each other (which are adjacent to each other at least in the scanning direction of the laser light L1)" when viewed from a direction perpendicular to a plane where the plurality of light diffusion channels 4a are arranged in two dimensions), luminance unevenness does not occur on the displayed image.

From the above-described knowledge, in the scanning-type display system 10 and further the scanning-type display device 1, the light diffusion unit 4 is configured so as to satisfy $P \geq (4\lambda L)/(\pi M)$ when the wavelength of the laser light L1 (the maximum wavelength among the center wavelengths of the laser lights L1 emitted from the light emitting portions) is denoted by $\lambda$, the effective opening diameter of the optical scanning unit 3 (the diameter of the mirror 3a) is denoted by M, the distance from the optical scanning unit 3 to the light diffusion unit 4 (the length of the optical path extending from the optical scanning unit 3 to the light diffusion unit 4) is denoted by L, and the arrangement pitch of the plurality of light diffusion channels 4a is denoted by P. Specifically, the arrangement pitch of the light diffusion channels 4a is set so as to satisfy $P \geq (4\lambda L)/(\pi M)$. Accordingly, the condensing size of the laser light L1 in the light diffusion unit 4 is set to be equal to or smaller than the arrangement pitch of the light diffusion channel 4a.

Figure 4:
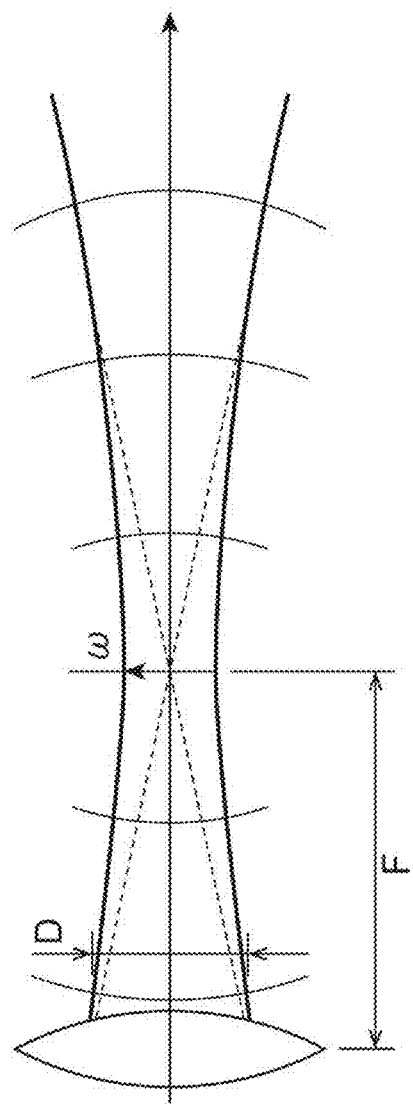
FIG. 4 is a diagram illustrating a light condensed state.

The reason is as below. As illustrated in FIG. 4, if the laser light is condensed by the condensing lens, $2\omega = (4\lambda F)/(\pi D)$ is satisfied when the wavelength of the laser light is denoted by $\lambda$, the spot diameter at the condensing position is denoted by $2\omega$, the focal length of the condensing lens is denoted by F, and the aperture diameter of the condensing lens is denoted by D. This equation shows that the spot diameter at the condensing position depends on NA on the image side (an angle in which the laser light is condensed at the condensing position). As NA increases, the spot diameter at the condensing position decreases. NA is determined by the diameter of the laser light in the condensing lens and the focal length of the condensing lens. Since F/D in the above-described equation indicates the "angle in which the laser light is condensed at the condensing position", it is understood that D=M and F=L on the assumption that the "spot diameter of the laser light L1 in the mirror 3a of the optical scanning unit 3"=the "effective opening diameter of the optical scanning unit 3" by a similar relationship. Thus, it is found that the condensing size of the laser light L1 in the light diffusion unit 4 is equal to or smaller than the arrangement pitch of the light diffusion channel 4a when the arrangement pitch of the light diffusion channel 4a is set so as to satisfy $P \geq (4\lambda L)/(\pi M)$.

Since the resolution increases as the condensing size (: $(4\lambda L)/(\pi M)$) of the laser light L1 in the light diffusion unit 4 decreases, the occurrence of the interference can be suppressed. Regarding this point, the distance (: L) from the optical scanning unit 3 to the light diffusion unit 4 is desirably small and the effective opening diameter (: M) of the optical scanning unit 3 is desirably large. However, when the distance (: L) from the optical scanning unit 3 to the light diffusion unit 4 is decreased, the tilting range of the mirror 3a needs to be increased in order to secure the scan range of the laser light L1 with respect to the light diffusion unit 4. Further, since the mirror 3a increases in size when the effective opening diameter (: M) of the optical scanning unit 3 is large, it is difficult to fast and stably tilt the mirror 3a. When the MEMS mirror is used as the optical scanning unit 3, it is particularly important to set the arrangement pitch of the light diffusion channels 4a so as to satisfy $P \geq (4\lambda L)/(\pi M)$ in consideration of the distance (: L) from the optical scanning unit 3 to the light diffusion unit 4 and the effective opening diameter (: M) of the optical scanning unit 3 since there is such a limitation.

Figure 5:
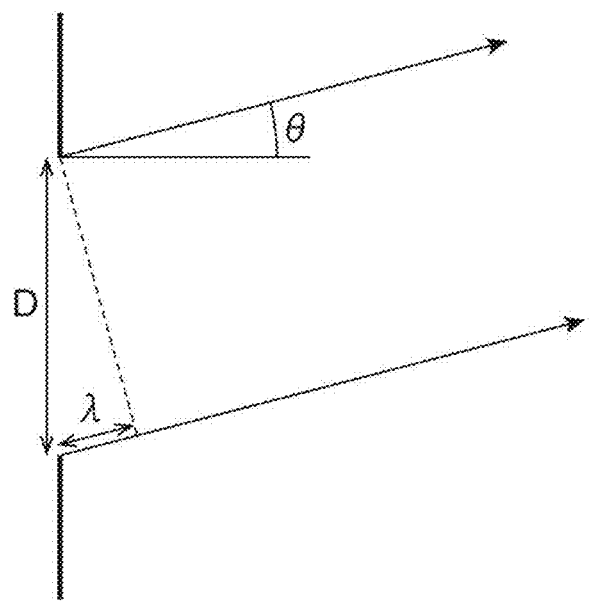
FIG. 5 is a diagram illustrating a light diffraction phenomenon.

In order to secure the utilization efficiency of the laser light L1, a relationship of the "spot diameter of the laser light L1 in the mirror 3a of the optical scanning unit 3"=the "effective opening diameter of the optical scanning unit 3" is desirable. However, there is a case in which the mirror 3a functions as an aperture in fact. In this case, the laser light L1 is diffracted when the laser light L1 is reflected by the mirror 3a. As illustrated in FIG. 5, the diffraction spread width S of the aperture is expressed by $S = L\lambda/D$ when the wavelength of the laser light is denoted by $\lambda$, the effective opening diameter of the aperture is denoted by D, and the distance from the aperture to the condensing position is denoted by L (here, it is assumed that the first-order diffracted light significantly affects). Thus, in the scanning-type display system 10 and further the scanning-type display device 1, the light diffusion unit 4 is configured so as to satisfy $P \geq (4\lambda L)/(\pi M) + L\lambda/M$ on the assumption that the laser light L1 is diffracted in the optical scanning unit 3. Specifically, the arrangement pitch of the light diffusion channels 4a is set so as to satisfy $P \geq (4\lambda L)/(\pi M) + L\lambda/M$. When the mirror 3a does not function as the aperture (that is, the "spot diameter of the laser light L1 in the mirror 3a of the optical scanning unit 3"<the "effective opening diameter of the optical scanning unit 3"), the arrangement pitch of the light diffusion channels 4a may be set so as to satisfy $P \geq (4\lambda L)/(\pi M)$.

In the optical scanning unit 3, there is a case in which the mirror surface of the mirror 3a is distorted. The spread radius E of the laser light L1 due to the distortion of the mirror surface (the spread radius of the condensing size of the laser light L1 in the light diffusion unit 4) E is expressed by $E = L \tan(2 \tan^{-1}(M/(2\phi)))$ when the distortion of the mirror surface is approximated to a sphere and its curvature radius is $\phi$. Thus, when the mirror surface of the mirror 3a of the optical scanning unit 3 is distorted, the light diffusion unit 4 is configured so as to satisfy $P \geq (4\lambda L)/(\pi M) + 2L \tan(2 \tan^{-1}(M/(2\phi)))$ in the scanning-type display system 10 and further the scanning-type display device 1. Specifically, the arrangement pitch of the light diffusion channels 4a is set so as to satisfy $P \geq (4\lambda L)/(\pi M) + 2L \tan(2 \tan^{-1}(M/(2\phi)))$.

The reason why this equation is satisfied is as below. First, It is assumed that the "light is geometrically condensed as one point on the primary image surface (the light diffusion unit 4) when the mirror surface is a flat surface" and the "distortion of the mirror surface is a spherical shape expressed by the curvature radius 4) and is uniform in the entire area of the mirror surface" (in fact, the distortion of the mirror surface may not have a spherical shape and may not be uniform in the entire area). The optical path of the laser light L1 is geometrically considered in a cross-section including the center of the curvature radius $\phi$ and the center of the mirror surface. When an angle formed by a "line connecting the outer edge of the mirror surface and the center of the curvature radius $\phi$" and a "line connecting the center of the mirror surface and the center of the curvature radius $\phi$" is denoted by $\theta$, $\theta = \tan^{-1}(M/(2\phi))$ is satisfied when $M \ll \phi$. By a similar relationship, an angle formed by a line connecting the mirror outermost edge points and a line perpendicular to the mirror distortion curvature center of the mirror distortion circle at the mirror outermost edge point is $\theta$. The reflection angle of the laser light L1 which is reflected by the outer edge of the mirror surface deviates by $2\theta$ due to the distortion of the mirror surface as compared with a case in which the mirror surface is a flat surface. The deviation amount E from the ideal condensing point on the primary image surface (the light diffusion unit 4) separated by the distance L is expressed by $E = L \tan(2\theta)$. Since the deviation amount E corresponds to the spread radius of the laser light L1 from an ideal condensed state, the spread radius E of the laser light L1 due to the distortion of the mirror surface is expressed by $E = L \tan(2 \tan^{-1}(M/(2\phi)))$.

As described above, according to the scanning-type display device 1 (and the scanning-type display system 10), the condensing size of the laser light L1 in the light diffusion unit 4 can be set to be equal to or smaller than the arrangement pitch of the light diffusion channels 4a. Thus, according to the scanning-type display device 1, it is possible to suppress an occurrence of luminance unevenness on a displayed image.

In the scanning-type display device 1, the light diffusion unit 4 is configured so as to satisfy $P \geq (4\lambda L)/(\pi M) + L\lambda/M$. Accordingly, since the condensing size of the laser light L1 in the light diffusion unit 4 can be set to be equal to or smaller than the arrangement pitch of the light diffusion channels 4a even when the laser light L1 is diffracted in the optical scanning unit 3, it is possible to suppress an occurrence of luminance unevenness on a displayed image.

In the scanning-type display device 1, the optical scanning unit 3 is an MEMS mirror. Accordingly, it is possible to realize the high-speed and high-accuracy scanning of the laser light L1 with respect to the light diffusion unit 4.

In the scanning-type display device 1, when the mirror surface of the mirror 3a of the optical scanning unit 3 is distorted, the light diffusion unit 4 is configured so as to satisfy $P \geq (4\lambda L)/(\pi M) + 2L \tan(2 \tan^{-1}(M/(2\phi)))$ when the curvature radius of the mirror surface is denoted by $\phi$. Accordingly, since the condensing size of the laser light L1 in the light diffusion unit 4 can be set to be equal to or smaller than the arrangement pitch of the light diffusion channels 4a even when the mirror surface of the mirror 3a of the optical scanning unit 3 is distorted, it is possible to suppress an occurrence of luminance unevenness on a displayed image.

In the scanning-type display device 1, the light diffusion unit 4 is a transmissive microlens array. Accordingly, it is possible to reliably and easily realize the diffusion of the laser light L1 by the plurality of light diffusion channels 4a arranged in two dimensions.

Although the embodiment of the present disclosure has been described above, the present disclosure is not limited to the above-described embodiment.

For example, the light source 2 is not limited to the laser diode (semiconductor laser) as long as coherent light (laser light) can be emitted therefrom and may be a surface emitting laser, a super luminescent diode (SLD), or the like. The optical scanning unit 3 is not limited to the MEMS mirror as long as the laser light can be scanned and may be a galvano mirror or the like. The light diffusion unit 4 is not limited to one which transmits and diffuses the laser light and may be one which reflects and diffuses the laser light. That is, the light diffusion unit 4 is not limited to the transmissive microlens array as long as the plurality of light diffusion channels 4a which are arranged in two dimensions are provided and may be a reflective microlens array, a micro mirror array, a diffraction grating, a fiber optic plate, or the like. When the light diffusion unit 4 is the transmissive microlens array, the light incident surface of the light diffusion unit 4 may be formed as a flat surface and the light emission surface of the light diffusion unit 4 may be formed as a plurality of convex surfaces corresponding to the plurality of microlenses. A plurality of concave surfaces may be formed instead of the plurality of convex surfaces so as to correspond to the plurality of microlenses.

The light diffusion unit 4 may be configured so that the arrangement pitch of the light diffusion channels 4a becomes a value set on the basis of $P \geq (4\lambda L)/(\pi M)$. For example, the light diffusion unit 4 may be configured so that the arrangement pitch of the light diffusion channel 4a satisfies $P \geq (4\lambda L)/(\pi M) \pm 20$ μm. The light diffusion unit 4 may be configured so that the arrangement pitch of the light diffusion channels 4a becomes a value set on the basis of $P \geq (4\lambda L)/(\pi M) + L\lambda/M$. For example, the light diffusion unit 4 may be configured so that the arrangement pitch of the light diffusion channels 4a satisfies $P \geq (4\lambda L)/(\pi M) + L\lambda/M \pm 20$ μm. The light diffusion unit 4 may be configured so that the arrangement pitch of the light diffusion channels 4a becomes a value set on the basis of $P \geq (4\lambda L)/(\pi M) + 2L \tan(2 \tan^{-1}(M/(2\phi)))$. For example, the light diffusion unit 4 may be configured so that the arrangement pitch of the light diffusion channels 4a satisfies $P \geq (4\lambda L)/(\pi M) + 2L \tan(2 \tan^{-1}(M/(2\phi))) \pm 20$ μm. That is, there is no need to satisfy a condition that $P \geq (4\lambda L)/(\pi M)$ in all light diffusion channels 4a. The same applies to a condition that $P \geq (4\lambda L)/(\pi M) + L\lambda/M$ and a condition that $P \geq (4\lambda L)/(\pi M) + 2L \tan(2 \tan^{-1}(M/(2\phi)))$. The arrangement pitch of the plurality of light diffusion channels 4a needs not constant and may be, for example, random.

The scanning-type display system 10 may not include the optical system 11 disposed at the subsequent stage of the light diffusion unit 4. Also in this case, it is possible to suppress an occurrence of luminance unevenness on a displayed image.

The above-described scanning-type display device 1 is not limited to the in-vehicle type and can be used in various situations such as a helmet built-in type and glasses type.

REFERENCE SIGNS LIST

1 . . . scanning-type display device, 2 . . . light source, 3 . . . optical scanning unit, 4 . . . light diffusion unit, 4a . . . light diffusion channel, 6 . . . condensing unit, 10 . . . scanning-type display system, 11 . . . optical system, L1 . . . laser light

The invention claimed is:

1. A scanning-type display device comprising:
a light source which emits projection-display laser light;
a condensing unit which condenses the laser light emitted from the light source;
an optical scanning unit which uses the laser light passing through the condensing unit in scanning; and
a light diffusion unit which includes a plurality of light diffusion channels arranged in two dimensions and diffuses the laser light scanned by the optical scanning unit,
wherein when a wavelength of the laser light is denoted by $\lambda$, an effective opening diameter of the optical scanning unit is denoted by M, a distance from the optical scanning unit to the light diffusion unit is denoted by L, and an arrangement pitch of the plurality of light diffusion channels is denoted by P, the light diffusion unit is configured so that the arrangement pitch becomes a value set on the basis of $P \geq (4\lambda L)/(\pi M)$.

2. The scanning-type display device according to claim 1, wherein the light diffusion unit is configured so that the arrangement pitch becomes a value set on the basis of $P \geq (4\lambda L)/(\pi M) + L\lambda/M$.

3. The scanning-type display device according to claim 1, wherein the optical scanning unit is an MEMS mirror.

4. The scanning-type display device according to claim 3, wherein when a curvature radius of a mirror surface of the MEMS mirror is denoted by $\phi$, the light diffusion unit is configured so that the arrangement pitch becomes a value set on the basis of $P \geq (4\lambda L)/(\pi M) + 2L \tan(2 \tan^{-1}(M/(2\phi)))$.

5. The scanning-type display device according to claim 1, wherein the light diffusion unit is a transmissive microlens array.

6. A scanning-type display system comprising:
a light source which emits projection-display laser light;
a condensing unit which condenses the laser light emitted from the light source;
an optical scanning unit which uses the laser light passing through the condensing unit in scanning; and
a light diffusion unit which includes a plurality of light diffusion channels arranged in two dimensions and diffuses the laser light scanned by the optical scanning unit,
wherein when a wavelength of the laser light is denoted by $\lambda$, an effective opening diameter of the optical scanning unit is denoted by M, a distance from the optical scanning unit to the light diffusion unit is denoted by L, and an arrangement pitch of the plurality of light diffusion channels is denoted by P, the light diffusion unit is configured so that the arrangement pitch becomes a value set on the basis of $P \geq (4\lambda L)/(\pi M)$.

7. The scanning-type display system according to claim 6, further comprising:
an optical system which is disposed at a subsequent stage of the light diffusion unit.

8. The scanning-type display device according to claim 2, wherein the condensing unit condenses the laser light so that a spot diameter of the laser light at a mirror of the optical scanning unit is smaller than a spot diameter of the laser light at the condensing unit and a spot diameter of the laser light at the light diffusion unit is smaller than the spot diameter of the laser light at the mirror of the optical scanning unit.

9. The scanning-type display device according to claim 2, wherein the arrangement pitch of the plurality of light diffusion channels is random.

10. The scanning-type display device according to claim 2, wherein a light incident surface of the light diffusion unit includes a plurality of convex surfaces.

11. The scanning-type display device according to claim 1, wherein a spot diameter of the laser light at a mirror of the optical scanning unit is equal to or smaller than the effective opening diameter of the optical scanning unit, and
the light diffusion unit is configured so that the arrangement pitch becomes a value set on the basis of $(4\lambda L)/(\pi M) + L\lambda/M \geq P$.

12. The scanning-type display device according to claim 11, wherein the condensing unit condenses the laser light so that a spot diameter of the laser light at a mirror of the optical scanning unit is smaller than a spot diameter of the laser light at the condensing unit and a spot diameter of the laser light at the light diffusion unit is smaller than the spot diameter of the laser light at the mirror of the optical scanning unit.

13. The scanning-type display device according to claim 11, wherein the arrangement pitch of the plurality of light diffusion channels is random.

14. The scanning-type display device according to claim 11, wherein a light incident surface of the light diffusion unit includes a plurality of convex surfaces.

15. A scanning-type display device comprising:
a light source which emits projection-display laser light;
a condensing unit which condenses the laser light emitted from the light source;
an optical scanning unit which uses the laser light passing through the condensing unit in scanning; and
a light diffusion unit which includes a plurality of light diffusion channels arranged in two dimensions and diffuses the laser light scanned by the optical scanning unit,
wherein when a wavelength of the laser light is denoted by $\lambda$, an effective opening diameter of the optical scanning unit is denoted by M, a distance from the optical scanning unit to the light diffusion unit is denoted by L, and an arrangement pitch of the plurality of light diffusion channels is denoted by P, the light diffusion unit is configured so that the arrangement pitch becomes a value set on the basis of $P \geq (4\lambda L)/(\pi M)$, and
a distance from the optical scanning unit to the light diffusion unit is longer than a distance from the light condensing unit to the optical scanning unit.

16. The scanning-type display device according to claim 15, wherein the light diffusion unit is configured so that the arrangement pitch becomes a value set on the basis of $P \geq (4\lambda L)/(\pi M) + L\lambda/M$.

17. The scanning-type display device according to claim 16, wherein the condensing unit condenses the laser light so that a spot diameter of the laser light at a mirror of the optical scanning unit is smaller than a spot diameter of the laser light at the condensing unit and a spot diameter of the laser light at the light diffusion unit is smaller than the spot diameter of the laser light at the mirror of the optical scanning unit.

18. The scanning-type display device according to claim 16, wherein the arrangement pitch of the plurality of light diffusion channels is random.

19. The scanning-type display device according to claim 16, wherein a light incident surface of the light diffusion unit includes a plurality of convex surfaces.

20. The scanning-type display device according to claim 15, wherein a spot diameter of the laser light at a mirror of the optical scanning unit is equal to or smaller than the effective opening diameter of the optical scanning unit, and
the light diffusion unit is configured so that the arrangement pitch becomes a value set on the basis of $(4\lambda L)/(\pi M) + L\lambda/M \geq P$.

21. The scanning-type display device according to claim 20, wherein the condensing unit condenses the laser light so that a spot diameter of the laser light at a mirror of the optical scanning unit is smaller than a spot diameter of the laser light at the condensing unit and a spot diameter of the laser light at the light diffusion unit is smaller than the spot diameter of the laser light at the mirror of the optical scanning unit.

22. The scanning-type display device according to claim 20,
wherein the arrangement pitch of the plurality of light diffusion channels is random.

23. The scanning-type display device according to claim 20,
wherein a light incident surface of the light diffusion unit includes a plurality of convex surfaces.

24. The scanning-type display device according to claim 15,
wherein the optical scanning unit is an MEMS mirror, and when a curvature radius of a mirror surface of the MEMS mirror is denoted by $\phi$, the light diffusion unit is configured so that the arrangement pitch becomes a value set on the basis of $P \geq (4\lambda L)/(\pi M) + 2L\tan(2\tan^{-1}(M/(2\phi)))$.

25. A scanning-type display system comprising the scanning-type display device according to claim 15.

26. The scanning-type display system according to claim 25,
wherein the condensing unit condenses the laser light so that a spot diameter of the laser light at a mirror of the optical scanning unit is smaller than a spot diameter of the laser light at the condensing unit and a spot diameter of the laser light at the light diffusion unit is smaller than the spot diameter of the laser light at the mirror of the optical scanning unit.

27. The scanning-type display system according to claim 26, further comprising:
an optical system which is disposed at a subsequent stage of the light diffusion unit.

\* \* \* \* \*